Aug. 15, 1967     E. H. IRASEK     3,335,728
RANDOM ACCESS MAGAZINE MEANS

Original Filed March 1, 1960     7 Sheets-Sheet 1

FIG.1

Inventor.
Eugene H. Irasek

By: Louis A. Kline
John J. Matlago
Nathan Cass
His Attorneys.

Aug. 15, 1967     E. H. IRASEK     3,335,728
RANDOM ACCESS MAGAZINE MEANS
Original Filed March 1, 1960     7 Sheets-Sheet 7

Inventor.
Eugene H. Irasek

By: Louis A. Kline
John J. Matlago
Nathan Cass
His Attorneys.

3,335,728
RANDOM ACCESS MAGAZINE MEANS
Eugene H. Irasek, Pacoima, Calif., assignor to The National Cash Register Company, Dayton, Ohio, a corporation of Maryland
Original application Mar. 1, 1960, Ser. No. 12,032. Divided and this application Apr. 30, 1964, Ser. No. 363,708
8 Claims. (Cl. 129—16.1)

This invention pertains to information-storage apparatus, and more particularly to apparatus of that class in which a very large number of binary bits of information must be accommodated by the store and in such form and manner as to permit easy and quick access to any bit or group of bits of the stored information.

This application is a division of my copending application Ser. No. 12,032, filed Mar. 1, 1960.

According to the invention the information is recorded, preferably by magnetic-recording techniques, on strips of strong flexible material. The strips are each provided with suspension or retainer means at one end and are suspended to hang in a magazine and are selectively released one at a time to fall into operating means which transports the strip through a transducing region past "reading" and recording or "writing" transducer means, and imparts momentum to the strip sufficient to return the strip to the magazine. The operating means is arranged for selective operation according to either of two modes. In the first mode a fallen strip is operated upon in a single passage through the transducing region and immediately thereafter is returned to the magazine via a return path; and in the second mode a fallen strip is recirculated through the transducing region one or more times before being returned to the magazine. During any passage through the transducing region the strip may be "read" by a transducer means, or the strip may have, one or more binary bits recorded or "written" thereon at respective specific locations; or both such operations may occur. The retainer means at the upper ends of the strips are so devised as to cooperate with a plurality of specially formed selector and suspender means in such fashion that when a particular combination of selector and suspender means is operated, a single strip corresponding to only that combination is released to fall by gravity into the operating means. Magazine loading means are provided for replacing a returned strip onto the selector and suspender means; and means are provided for insuring that the suspended strips in the magazine are maintained in spaced-apart relationship whereby any selected one of the strips may readily be released and allowed to drop from the magazine irrespective of its position relative to the remainder of the strips. Since by utilizing known magnetic-recording techniques and materials a quite large number of binary bits of data or information can be stored (recorded) in each square inch of magnetic surface, a large amount of data or information may be stored on a single strip of, for example, three and one-fourth inches width and fourteen inches length. Such a strip, formed of thin durable film-like material with a magnetic coating, may, for example, contain six information channels each divided into twelve hundred and forty "slabs" each of which slabs is divided into thirty-one blocks. In such an arrangement, over two hundred thousand bits of information may be stored on each strip; and if, for example, two hundred and fifty-five strips are contained in the magazine, in excess of fifty-eight million bits may be stored therein. And, since according to the invention any desired one of the strips may be selectively released, dropped, operated upon, and returned to the magazine within a small fraction of one second, it is evident that the invention provides a "random-access" information-store offering quite large storage capacity with access-time greatly reduced from that required, for example, with apparatus utilizing long lengths of magnetic tape as the storage medium. And since a set of the strips may be easily and quickly replaced by any one of other sets of strips stored in convenient containers, the apparatus provides for great flexibility and extended access to almost any possible amount of stored information. The operations of the several cooperating units of the apparatus are electrically controlled, principally by signals furnished by external means such as a data-processor.

With the preceding brief general descrpition of principal features of the invention in view, it is evident that a principal object of the invention is to provide improvements in large-storage-capacity fast-access information stores. Another object is to provide improvements in random-access multiple-unit data-storage apparatus. An additional object of the invention is to provide means permitting random-access to any datum contained in a large number of readily replaceable high-density data-storage units with a minimum expenditure of time.

Other objects and advantages of the invention will hereinafter be made apparent or will become apparent upon consideration of the appended claims and the description of a preferred illustrative embodiment of apparatus which is depicted in the drawings forming a part of this specification. In the drawings:

In describing the preferred form of the invention and in the claims certain words and terms will be used which terms and words will have special meanings that may or may not be exactly the same as those defined in a standard dictionary; and the intended meanings of these terms will herein be stated or defined. For example, by the term "random-access" is meant selective next-in-time accessibility of any desired unit of, for example, an information-store comprising many discrete separate data-storage units irrespective of the location of the desired unit within the store. The terms "data" and "information" are herein considered to be synonymous. In the presently described apparatus each strip comprises a unit of information-storage and each unit may store information in several channels each having many sub-units (slabs) and each of the latter comprises many other smaller sub-units; and the actual presentation of a desired information bit or information address at the transducer region is effected in a plurality of stages of which the first comprises selection and release of the particular strip containing that bit or address. The term "address" is herein used in the usual computer-terminology sense.

Figure 1:
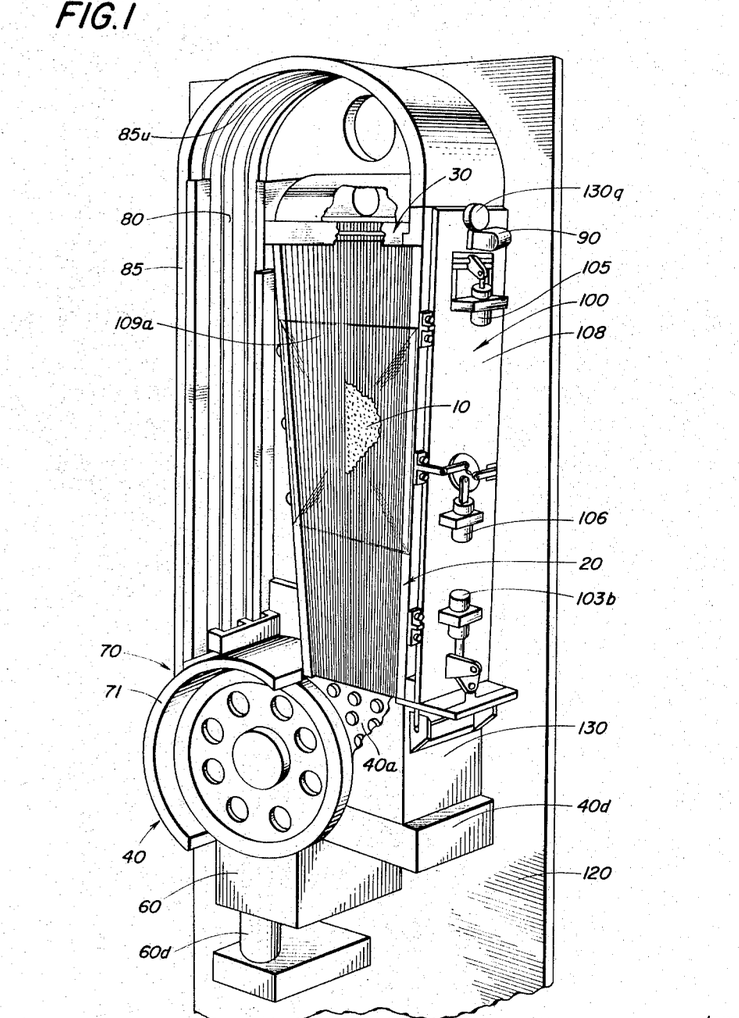
FIG. 1 is a perspective view of principal units of the apparatus in assembled form, with portions broken away and parts including a base plate removed to facilitate disclosure of certain details.

Referring to FIG. 1, a plurality of information-storing strips 10 (hereinafter termed strips) are releasably suspended in a magazine represented generally by the ordinal 20, by strip suspension, selecting and releasing means indicated generally by ordinal 30. The magazine 20, means 30 and other components of the apparatus are supported upon frame means hereinafter described. Means 30 comprise a plurality of rod-like elements, and are constructed and arranged to support a large number of strips 10 and to be operable to select and release any desired one of the strips irrespective of its position in the magazine. The strips are assigned respective binary code numbers and each strip comprises means uniquely representing its number and which cooperate with the rod-like elements, and the rod-like elements are operated in correspondingly coded configurations to release desired strips at the proper times. These means and the mode of operation thereof for selecting and dropping any specified strip will hereinafter be explained in detail. A released strip drops gravitationally into an operating means indicated generally at 40, and into a position in which its lower end portion engages the periphery of a perforated drum or capstan 40a comprised in operating means 40. Appropriate portions or arcs of the path of the peripheral inner surface of the capstan 40a are during appropriate intervals of time pneumatically connected to suction means for provision of a pressure differential between the exterior and interior of the capstan whereby the strip is forcibly held in contact with and is moved by the capstan. During operation of the apparatus the capstan is continuously rotated at a suitable speed by driving means such as an electric motor, whereby the engaged strip is very rapidly driven or transported through the transducing region in which the magnetic transducer means indicated generally at 60, are situated. The transducer means are hereinafter more fully described. Application of the pressure differential or suction during appropriate intervals and over only certain limited arcs of the peripheral path of the capstan permits the strip to follow a course or path only parts of which are coincident with the surface of the capstan, whereby good contact with transducing means may be secured, and whereby the strip is permitted to be guided away from the capstan for return to the magazine. Electrically controlled and operated switch or gate means indicated generally at 70 are provided to permit, alternatively, the aforementioned immediate return of the strip to the magazine, or one or more additional passes of the strip past the transducer means. The gate, when open, allows the lower or leading end of the strip to enter a raceway formed as part of guide means indicated generally at 80 and extending upwardly and over the magazine. When closed, the gate forces the moving strip to follow a path in which the strip is again drawn by suction into contact with the surface of the capstan and thereby brought around and again passed through the transducing zone. For proper operation of the strip-transport means the diameter of the capstan is such as to provide a circumference of sufficient length to preclude overlap of the leading and trailing ends of a strip when the latter is being re-passed through the transducing zone.

As previously indicated, when operations with a strip by the operating means comprising transport means 40 and transducer means 60 have been completed and the switch or gate means 70 are open, the strip is propelled upwardly along the guideway in guide means 80 and the strip proceeds by its momentum along the inner surface of the curved upper portion of the guideway, and downwardly past a photoelectric detector means indicated by ordinal 90, into a loading means indicated generally at 100. The loading means serves to arrest the strip in proper position for loading onto the suspension means, and to thereafter force the returned strip onto the suspension and releasing devices in means 30. The detector means 90, which preferably comprises photoelectric detecting means, senses arrival of the leading end of the returning strip and initiates certain loading-means operations, and later senses passage of the trailing (upper) end of the strip and initiates other operations of the apparatus, as will hereinafter be explained in detail. It will be understood that following release of a strip the strip-selecting-and-releasing means may be temporarily rendered inoperative for releasing another strip, and maintained in this inoperative status until the dropped strip is removed from the lower (operating) end of the apparatus. The strip selecting and releasing means 30 include pneumatic means for intermittently supplying and directing narrow streams or currents of air downwardly upon and between portions of the suspended strips during appropriate time intervals, for the purpose of keeping the strips separated so any selected and released strip will readily descend into the operating means without appreciable interference by the other strips.

With the foregoing principal components of the apparatus and their functions and relationships thus generally disclosed, more detailed descriptions of the several enumerated principal means of the apparatus will now be made, commencing with the strip suspension, selecting, and releasing means.

Figure 12:
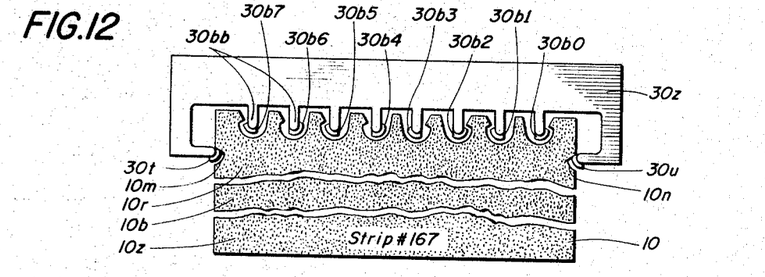
FIG. 12 is a view showing strip suspending and strip selecting bar and rod means, with a typical information storage strip retained by the bar and rod means, but with upper and lower portions of the strip removed in the interest of conservation of drawing space.
Figure 12A:
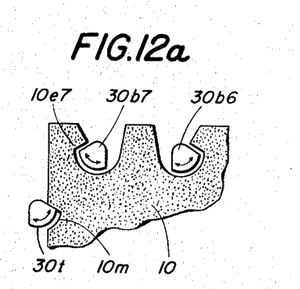
FIG. 12a is an enlarged fragmentary view depicting details of strip-selecting and strip-suspending means in operative relationship with an information-store unit, with a portion of the latter broken away.
Figure 13:
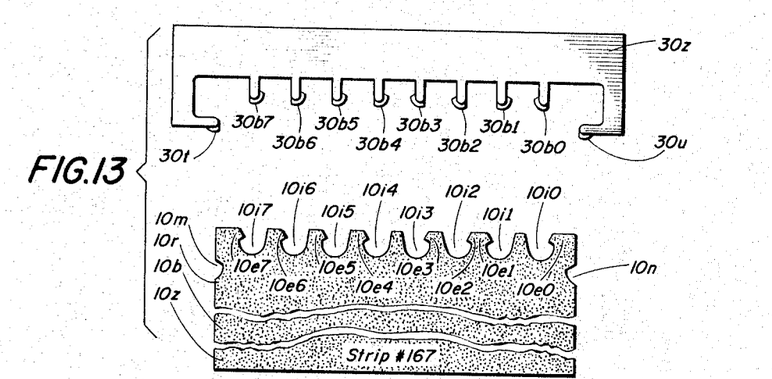
FIG. 13 is a view indicating the relative dispositions of a typical strip and the strip suspending and releasing means, shortly following selection and release of a strip, with portions of the strip broken away.
Figure 14:
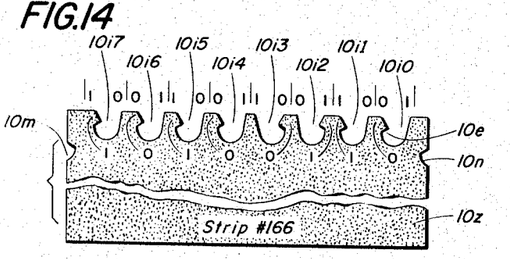
FIG. 14 is a view of a typical information-storage strip, with a part broken away, illustrating the means used for coding individual strips.

As indicated in FIGS. 13 and 14, the strips 10 are each provided with a pair of opposed indentations or notches 10m, 10n disposed at respective upper side margins. The upper inclined edges provided by these notches cooperate with complementary supporting surfaces of respective ones of a pair of rotatable suspender bars 30*t*, 30*u*. The suspender bars are formed of sector-shaped cross-section as indicated in FIG. 12*a*, and are mounted for rotation about the axes of the sectors, in a frame 30*z* formed as part of means 30. The two suspender bars are constructed and arranged for opposite concurrent rotation outwardly from the strips, and inwardly into supportive engagement with the strips, by power means hereinafter described. As indicated in FIGS. 12 and 13 each of the strips comprises a lower end portion 10*z* (hereinafter termed the leading end), a middle or body portion 10*b* and an upper end portion 10*r* in which the supporting notches 10*m*, 10*n*, are located. In the upper marginal edge of each of the strips there is formed a plurality of indentations or notches generally denoted 10*i* and exemplified by notch 10*i*0, and of which indentations there are eight in the exemplary form; and each individual strip has a unique set of retainer lugs or ears generally denoted 10*e* and exemplified by ear 10*e*7, formed integral therewith and disposed at one or the other (left or right) side of a respective one of the upper marginal indentations in dependence upon a code notation to be described. The retainer lugs or ears are adapted for cooperation with respective ones of a set of eight rotatable selector rods, such as 30*b*7 for example, and which bars are similar to the suspender bars in shape, construction and mounting. The selector rods are adapted to be rotated into and out of engagement with retainer ears of the strips for selective release of individual ones of the strips as presently will be explained. Each of the selector rods is individually operable by means hereinafter explained.

Figure 15:
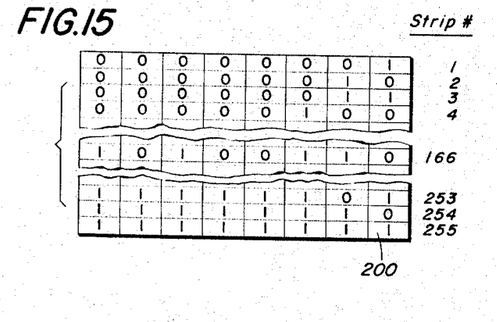
FIG. 15 is a binary truth table, with portions removed, indicating the coding configuration or plan for a plurality of information-store units or strips.

The system employed to permit selection of any individual strip by operation of a respective set of selector rods 30*b*, is illustrated in FIGS. 13, 14 and 15. In accord with principles of the binary system of numbers employed in the code designation of strips whereby control of releasing of the strips may be easily effected by a digital information-processor, each of the strips is provided with as many upper-margin notches or indentations as there are binary orders in the code numbers used; and occurrence of a binary "1" in a code number is represented by a retainer ear 10*e* in a particular position in the corresponding indentaton 10*i* of the strip bearing that code number. In the illustrative or exemplary apparatus there are two hundred and fifty-five strips in each set or pack (magazine-full), hence, as indicated in FIG. 13, there are eight upper-margin indentations 10*i*0, 10*i*1 . . . 10*i*7, each corresponding to a respective binary order $2^0, 2^1, 2^2 \ldots 2^7$. Each marginal indentation has two sides, left and right, and it is evident that either of the sides may be selected to represent the binary value "1" and the other side the value "0." For purposes of securing more uniform retention and suspension of the strips, the binary value "1" is assigned to the right side of each of the alternate indentations, 10*i*0, 10*i*2, 10*i*4 and 10*i*6 and to the left side of each of the other indentations; and the binary value "0" is assigned to the sides opposite those assigned the value "1," all as indicated above exemplary strip No. 166 in FIG. 14. With the described arrangement, the binary numbers corresponding to respective decimal numbers 1 through 255 may be represented by respective configurations or dispositions of retainer ears 10*e* in the upper marginal indentations. Thus, in FIG. 14, the retainer ear configuration for binary number 10100110, corresponding to decimal number 166, is shown as it occurs on the strip of that designation. Therein the retainer ear 10*e* for indentation 10*i*0, that is, for the lowest order position, is at the left or "0" side of the indentation, that for indentation 10*i*1 corresponding to the next higher binary order is at the left or "1" side of the indentation, etc.; and the corresponding binary digit represented by the ear in each of the indentations is thereunder indicated. Thus it is evident that to select strip No. 166, selector rods 30*b* in each of indentations 10*i*0, 10*i*3, 10*i*4 and 10*i*6 must be in or rotated to "0" attitude or position, and the other selector rods similarly be in or rotated to "1" position. The configuration of retainer ears for any of the set of strips is readily derived from an ordinary "truth table" which lists all the possible combinations of binary digits in representations of any specified number of binary positions. For example, a truth table 200 for the eight binary positions required in the strip-coding in the exemplary apparatus, is depicted in fragmentary form in FIG. 15. Therein the code designations for the first four strips, the last three strips, and the aforedescribed exemplary strip No. 166 are indicated; and from the binary values represented in the table the respective retainer-ear configurations for the strips of the set are derived for use in punching the several strips.

As indicated in FIG. 12, a typical strip 10 is shown suspended by suspender bars 30*t*, 30*u*, and retained by engagement of selector rods 30*b* engaging respective retainer ears. By reference to FIGS. 13 and 14 it is evident that the ear-configuration corresponds to binary number 10100111, or decimal number 167, and hence the strip is identified as strip No. 167. In the exemplary apparatus the selector rods are spring-stressed to the "1" positions, that is, to positions in which they engage retainer ears that are in the "1" sides of indentations. This normal attitude or positional relationship is illustrated in FIG. 12. Thus it is evident that when strip No. 167 is to be selected, selector rods 10*i*0, 10*i*1, 10*i*2, 10*i*5 and 10*i*7 must be rocked or rotated from "1" position to "0" position, and rods 10*i*3, 10*i*4 and 10*i*6 must be left in "1" position. Thus for the selection of this exemplary card, activating current signals will be supplied to the respective actuators for the selector rods to be moved, and no current signals will be supplied to the other selector rod actuators. The actuators will presently be described. Following operation of the required set of selector rods in response to receipts of the respective set of signals from a processor-operated controller, the two suspender bars 30*t* and 30*u* are rocked outwardly and the selected strip drops under the influence of gravity, and the selector rods and suspender bars are then permitted to return to respective normal "1," and strip-supporting, positions. It is evident that during the interval in which the suspender bars are rocked outwardly, all strips excepting the selected strip are momentarily suspended from the selector rods.

During operation of the apparatus, with the exception of the brief intervals during which a strip is being loaded into the magazine or is being selected by rotation of the selector rods and released by rotation of the suspender bars, currents of air are directed downwardly against the upper ends of the suspended strips in the magazine. These air currents, which are formed by division of a single air current by a slit-type grille, pass downwardly between upper-end portions of the strips and laterally therefrom, and serve to maintain the strips separated. The grille is formed with $n+1$ slits or passages, $n$ being the number of strips in a full magazine; and the grille is so disposed as to form thin wide air currents and to direct the currents parallel to the planes of the suspended strips. The effect of each air current is that known as the Bernoulli effect, and serves according to known physical principles. The air supply to the grille is stopped-off during strip selection and release, whereby a released strip may fall without whipping or other undesired action.

Figure 2:
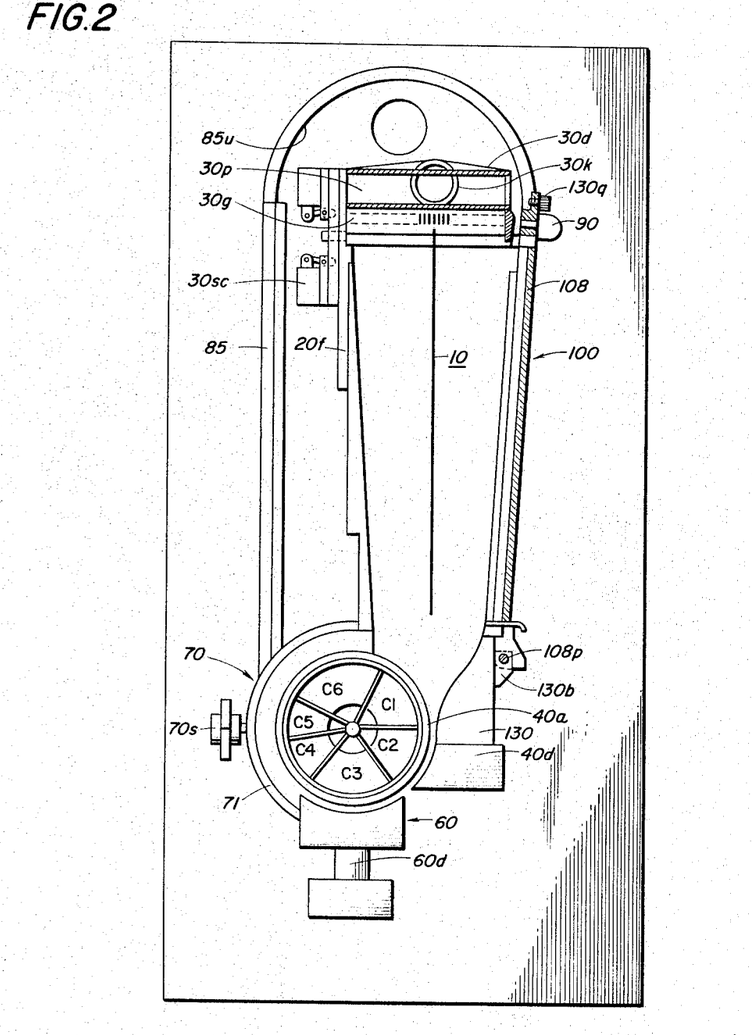
FIG. 2 is a vertical view partly in section transversely through the apparatus, with some parts removed and some portions broken away.

As indicated in FIG. 2, air is supplied through a conduit 30*k* into a generally rectangular chamber 30*p* formed by a box 30*d* closed at its top and sides and having as its floor a grille 30*g* formed by a number of closely-spaced parallel plates secured together with intervening spacer-strips at their ends only, by suitable means such as solder. As indicated in enlarged fragmentary form in FIG. 10, the plates 30*f* of the grille 30*g* are disposed slightly above and transversely of the selector rods 30*b*; and as there indicated, individual thin wide air streams, indicated by downwardly directed arrows *a*, pass down from the grille and between respective pairs of strips 10. As previously noted, the air is supplied through a conventional tubular conduit 30k, which conduit extends from a conventional rotary-solenoid-operated valve 30y (FIG. 8), to which air is supplied by means hereinafter described and explained. The solenoid of valve 30y is supplied energizing current at the proper times from means hereinafter described, the valve being so constructed as to be normally spring-stressed into position to supply air to conduit 30k but arranged to exhaust air into the ambient atmosphere when the solenoid is energized.

Figures 10, 11:
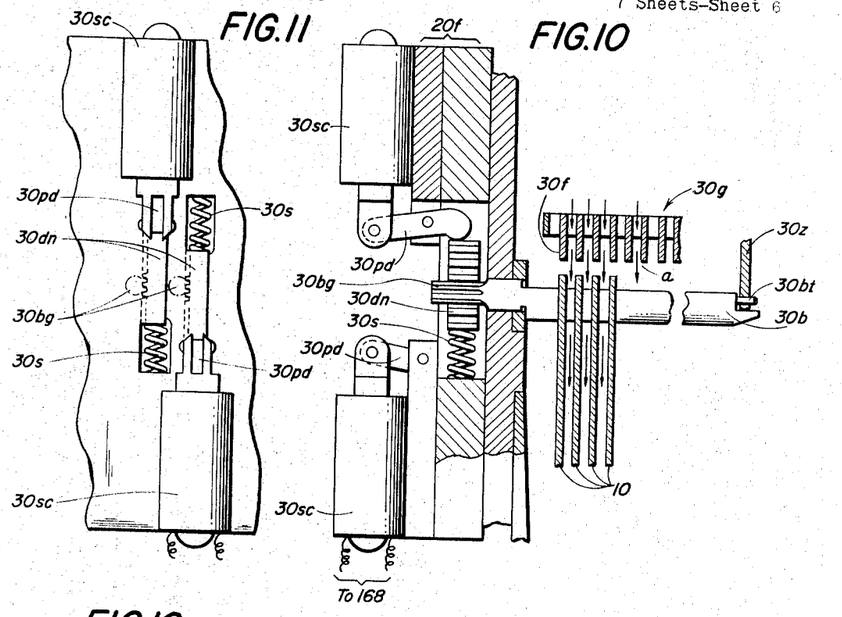
FIG. 10 is a partial-section view depicting an air-entrance grille, a strip-selector rod, the actuating means for the rod, and indicating the spatial relationship of those parts to each other and to a plurality of information-store strips.
FIG. 11 is a face view depicting the driven ends of two strip-selecting rods and the respective driving or actuating means for the rods.

The means provided for selectively operating the selector rods 30b and suspender bars 30t and 30u are illustrated in FIGS. 10, 11 and 12. Those means comprise, in the exemplary apparatus, eight similar selector rod actuators and two suspender bar actuators, all of which are sufficiently similar that description of one will suffice for all. As depicted, the front ends of the rods and bars are provided with respective round trunnions 30bt which extend into and are supported in aperture-bearings, such as 30bb (FIG. 12), provided in a front support-plate 30z formed as part of the grille-mounting frame of means 30. The rear ends of the rods and bars are formed as (or have secured thereto) small gears such as 30bg, which are constructed and arranged to be driven by respective racks, such as 30dn. The racks are constructed and arranged to be driven in one direction by respective suitably mounted compression springs such as 30s, mounted as indicated and bearing upon or effective against one end of a respective rack; and the racks are arranged to be driven in the opposite direction by respective levers, such as 30pd pivoted to magazine frame means 20f as indicated and arranged to be rocked in one direction by respective solenoid-and-core means such as 30sc. As indicated in FIG. 11, the solenoid and rack means for alternate rods may be mounted in inverted relationship to the intervening solenoid and rack means, in the interest of good design; and it will be evident that the means for operating the suspender bars are suitably mounted to accommodate the slight difference in elevation of those bars. Thus the bars and rods are by the respective springs normally forced to their "1" position, and may be rotated or rocked to the respective "0" positions by energization of the corresponding solenoid coils, selectively. Current pulses, or actuating signals, are supplied by a controller and power supply means 180c indicated in FIG. 16 and forming part of an information processor, by way of a set of conductors included in lead 168 connecting the solenoids to the controller. It is evident that a set of eight selector rod signals (represented by respective currents, or absence thereof) is supplied through the respective circuits, with a following but concurrent set of suspender-bar signals, all of which become effective through the described mechanism to select and release the particular strip whose code designation corresponds to the coded signals supplied to the selector-rod solenoids.

During selection, release, and dropping of a strip it is desirable to prohibit the downwardly directed air streams from interfering with the releasing and falling of a strip, and accordingly, as previously indicated, the selector-rod signals are preceded by a signal to valve 30y (FIG. 8), whereby to divert the air stream from the grille to the ambient atmosphere; and this diversion continues until the strip has been engaged by the capstan and moved into triggering relationship with a photo-detector means 40d (FIG. 1), positioned to detect presence of a strip in the capstan-engagement sector of the operating zone. Thus, during the free fall of a strip the solenoid of valve 30y is energized and the air supply to the grille is cut-off (diverted), and the released strip falls into the operating means, which will next be described.

*Operating and transducer means*

Figures 8, 9:
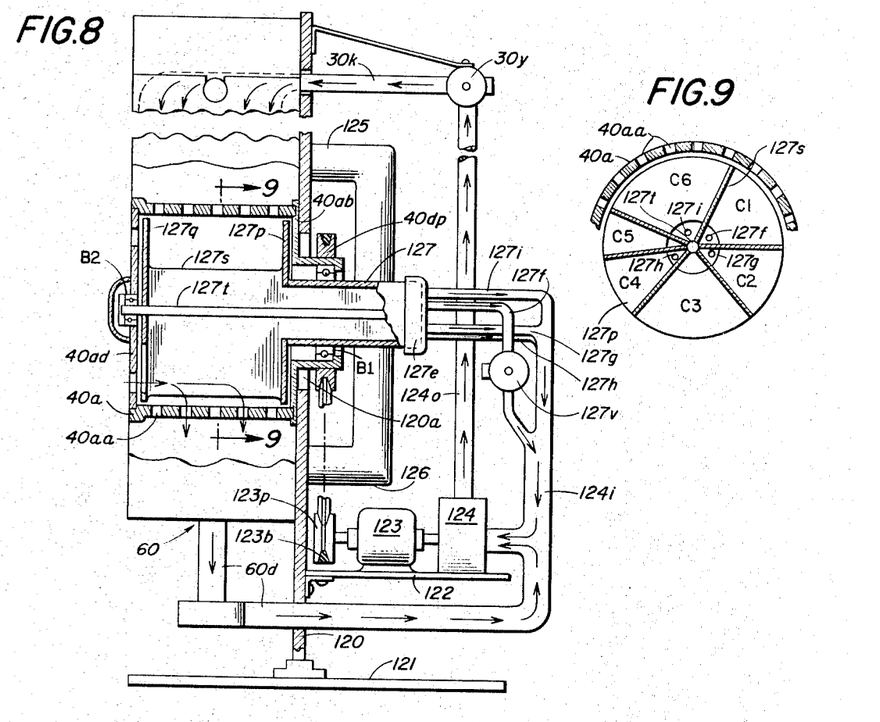
FIG. 8 is a partly-schematic partly-sectional diagram of principal support means, a strip-driving capstan and associated apparatus used to drive the capstan, and pneumatic apparatus employed to exhaust and supply air.
FIG. 9 is a partial-section view of a capstan and spider means shown in part in FIG. 8, taken on line 9—9 in the latter figure, with parts broken away.

As indicated in FIG. 8 the principal support means of the apparatus is an upright plate 120 supported by a laterally extending foot or base plate 121 to which it is secured. Extending laterally from and supported by upright plate 120 is a shelf plate 122 upon which is mounted driving and blower means which in the interest of simplicity are shown as a single drive motor 123 and a single direct-connected blower means 124. It will be understood that a plurality of blowers, and separate drive-motors, may be used for more economical operation.

Secured to plate 120 is a pair of brackets 125, 126. The brackets are constructed and arranged to rigidly support a tubular support 127 with its axis perpendicular to plate 120. The support 127, secured to the brackets in any suitable manner, as, for example, by brazing, extends through a large hole or aperture 120a formed in plate 120, as indicated. At its outer end the support is covered with a cap 127e, into which extend four ducts or conduits whose function will presently be explained. Support 127 has secured to its interior a plurality of vane-like elements of a spider 127s which, as indicated in FIG. 9, divides the interior of the support and the interior of the capstan into a plurality of separate chambers denoted C1, C2, C3, etc. The spider also comprises an annular flange member 127p which is secured to the inner end of the support 127, a disc-like end piece 127q, and an axially-disposed trunnion shaft 127t. Affixed upon the exterior of support 127 as indicated in FIG. 8 is the inner race of an antifriction bearing B1, the outer race of which is fitted in a complementary portion of the inner end member 40ab of capstan 40a. The outer end of the capstan comprises a disc 40ad which is rotatably mounted on a second bearing B2 affixed to and supported by the outer end of trunnion shaft 127t. Secured upon end member 40ab of the capstan is a pulley 40dp, disposed in alignment with the drive pulley 123p of motor 123, whereby the capstan may be driven by a belt 123b which is engaged with both pulleys. The capstan is provided with a multiplicity of spirally arranged perforations 40aa through which air may be drawn into one or another of the aforementioned chambers C1, C2, etc.

Figures 3, 3A:
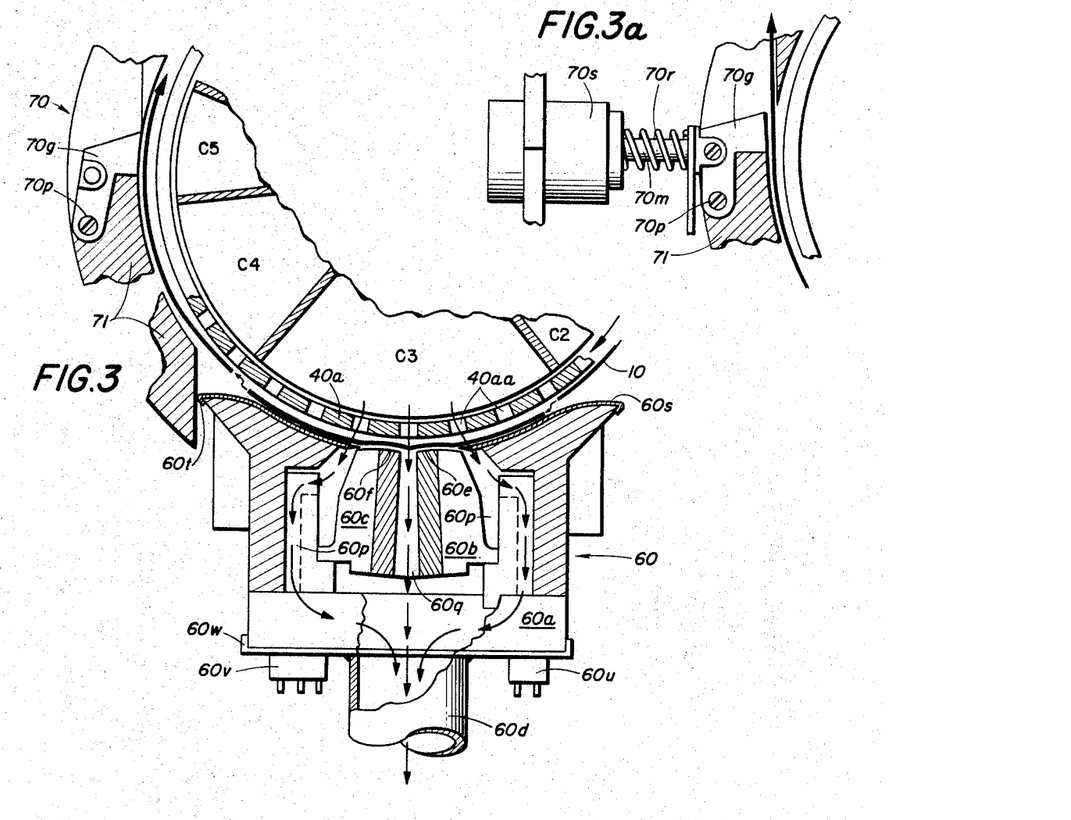
FIG. 3 is a partial sectional view of a capstan, a strip-gate, and a transducing means, with portions of an information-storage strip in operative relationship with the capstan, the gate, and the transducing means, but with transducing means and capstan moved apart to facilitate illustration.
FIG. 3a is a fragmentary view of a strip-gate means in open position, and a gate-operating means.

Shown secured in respective openings in cap 127e of tubular support 127, and thus communicating with respective ones of chambers C1, C2, C4 and C6, are four exhaust or suction ducts 127f, 127g, 127h and 127i. Of these ducts the latter three exhaust directly into intake duct 124i of blower 124; and the other, 127f, communicates with duct 124i through a solenoid-operated valve 127v. For simplicity in illustration these ducts have been illustrated as opening into respective chambers through cap 127e; however, it is to be understood that in certain embodiments of the apparatus the ducts be larger than shown and may open into respective chambers C1, C2, etc., by way of apertures formed in the periphery of support 127. Also connected to the intake duct 124i is the transducer-means exhaust ducting 60d. The outlet port of blower 124 is connected to a duct 124o which serves to supply air to duct 30k by way of valve 30y. Thus when the apparatus is in operation, air is by the described means normally continuously drawn through perforations of the capstan and into and through chambers C2, C4 and C6, and through the transducer means into ducting 60d. Further, when valve 127v is open, air is drawn from chamber C1; and air is continuously supplied to valve 30y for use in maintaining the strips separated in the magazine. Directions of air flow are indicated by arrows; and it is to be understood that damper-type valves (not shown), may be employed in the several ducts to regulate air flow, dependent upon the physical dimensions and capacities of the pneumatic means. Further, for maximum economy of operation, separate blowers for each exhaust duct may be employed. The power supply to the motor and valve solenoids will hereinafter be explained in connection with FIG. 16. During operation of the apparatus the drive motor is energized and the capstan rotates at a substantially constant speed. Air is continuously exhausted from within the transducer means 60 and from within chambers of the capstan, and air is supplied to the stream-forming grille above the strips. Contemporaneously with release of a strip 10 from the magazine, suction in chamber C1 is cut off by valve 127v. Thus as the leading edge of the strip engages the capstan it is not violently jerked but is more gently accelerated by frictional contact; and a brief interval thereafter the suction is re-applied and the leading end of the strip is positively driven through the suction zone or sector C2 and thence into and through the transducing zone opposite chamber C3, as indicated in FIG. 2. After once being engaged by the capstan due to pressure differential, the strip is propelled or driven in an obvious manner by only partial engagement over those sectors at which the pressure differential is evident. Since suction is not applied to chamber C3 but is in the transducing zone applied from within the transducing means 60, the strip is induced, by a combination of centrifugal force and downwardly acting pressure differential, to move away from the capstan and into intimate and effective transducing relationship with the transducer means. As the leading edge of the strip moves out of the transducing zone it enters the region or sector opposite chamber C4 to which suction is applied, and is thus again drawn into driven engagement with the capstan. As the leading edge of the strip approaches the gate means 70, it enters a zone or sector opposite chamber C5 in which suction is not evident, and it therefore may move away from the capstan if the gate is open. If the gate is closed, a guide-surface on the gate guides the leading edge along a path in which the strip travels substantially in contact with the periphery of the capstan and onward into the zone opposite chamber C6 in which the suction is effective. If the gate is open, centrifugal force causes the leading edge of the strip to move away from the surface of the capstan and into the lower end portion of guideway 85. In either case, the leading end and body portions of the strip follow the leading edge; in the first case the strip is drawn or carried on around a generally circular path and again passes through the transducing zone, and in the second case the strip is propelled upwardly into the guideway at high speed with the result that following movement of the trailing edge away from the capstan the momentum of the strip drives the strip around through the upper portion 85u of the guideway and down into the magazine loading means. The decision as to whether the strip is to make a single pass through the transducing zone, as for a single "reading" operation, or is to make two or more passes, is made by computer means in, for example, a data-processor, as translated by an intermediate apparatus or system herein termed a controller, which furnishes to the gate actuator one or the other of binary signals, one represented by "1" and the other by "0." The "1" signal may, for example, be evidenced by a properly timed pulse of electric current passing through the solenoid 70s of the gate actuator, whereby the gate is opened and the strip returned to the magazine, and the "0" signal then being evidenced by absence of such a current pulse whereby the normally-closed gate remains closed and the strip is recirculated through the operating zone. The gate means, as indicated in FIGS. 3 and 3a, comprises a gate bar 70g pivotally mounted on a pivot 70p carried upon a fixed shroud 71 which extends part-way around the periphery of the capstan. The gate bar is pivotally connected to a spring-stressed actuator link 70m which is moved toward gate-closing attitude by a spring 70r and drawn into gate-opening attitude by the core of solenoid 70s when the solenoid is energized. The solenoid is fixedly secured to shroud 71 as indicated. That part of the operating and transducing means disposed in the transducer zone will next be described.

Figure 4:
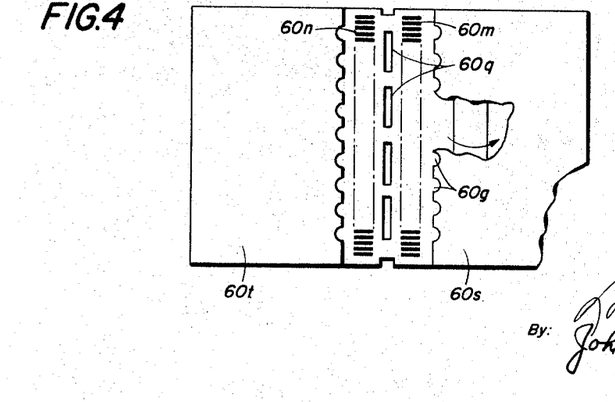
FIG. 4 is a face view of a multiple-head electromagnetic transducing means with strip-contacting shields in place but with portions broken away, showing air passages.

As depicted most clearly in FIGS. 3 and 4, transducer means 60 comprise a housing including a frame 60a in which are adjustably mounted first and second multiple-head electromagnetic transducers 60b, 60c. The transducers have respective curved and polished upper faces 60e, 60f, over which strips 10 are propelled and into contact with which the strips are urged by a pressure-differential provided between air chamber C3 formed in the interior space within capstan 40a, and open air-passages formed in the transducer means. Air is admitted to chamber C3 at atmospheric pressure through apertures in the end disc 40ad of the capstan, and is exhausted through passages in the transducer means into a conduit 60d connected to blower 114 (FIG. 8). As indicated in FIG. 3, wherein sections of the two multiple-unit transducers have been removed, and in FIG. 4 which depicts the active or strip-contacting faces of the transducers, air passages 60p and 60q are provided, the latter being formed by opposed grooves produced in the abutting faces of the transducers. Outer air passages 60p, 60p are produced by suitable forming or shaping of the parts comprising frame 60a of the transducer means, and these passages lead to small openings 60g formed by the scalloped edges of right and left tape-guiding shields 60s, 60t (FIG. 4) along the lines of contact of the shields with the transducer upper faces 60e and 60f. The paths of the air currents are indicated by arrow-pointed lines, and it will be evident that due to the pressure-differential between opposite faces of a strip as it progresses over the transducer heads, the strip will be urged downwardly into intimate contact with shields 60s, 60t, and with the faces 60e, 60f of the transducers. Thus the strip travels in an undulatory path over the transducer means, as indicated in FIG. 3; whereby uniform and excellent transducing action is achieved. As previously indicated, the space within capstan 40a is divided into chambers by stationary baffles or partitions some of which chambers are connected to the intake of the blower to provide suction over sectors of the periphery of the capstan, and the others of which chambers are open to the ambient air at atmospheric pressure. Thus within a zone or sector defined by chamber C2 and extending to the curved lip of right-hand shield 60s, a strip is subjected to suction applied from within the capstan through apertures 40aa, so that the strip is propelled along in contact with the capstan. The suction is relieved at the juncture of the zones defined by chambers C2 and C3, and at that point centrifugal force acts to cause the strip to lose contact with the capstan and to follow a path leading to contact with shield 60s. It is under that condition that the strip moves past the air passage openings in the transducer means, and hence the strip may proceed in the aforementioned undulatory path and into contact with shield 60t. As the strip is propelled along the surface of shield 60t, it enters a zone opposite chamber C4, wherein the pressure differential is inward and the strip is thus again drawn firmly into driven contact with the periphery of the capstan 40a.

The exemplary transducers depicted comprise respective aligned rows of transducer heads, such as those magnetic pole pieces indicated at 60m, 60n in FIG. 4. The transducer circuits (magnetic and electrical) may be of well-known or conventional construction and are not per se of the present invention and hence are not herein further described. The electrical connections to the multiplicity of transducer heads are through conventional insulated leads connected to multiple-contact quick-disconnect plug sockets 60u, 60v (FIG. 3) which are mounted in a base cap 60w secured to frame 60a. Complementary multiple-conductor plugs terminating leads 167 (FIG. 16) extending from a controller 180c permit easy change of transducer means. From the preceding description it is evident that a strip, progressing from right to left in the direction of the arrow in FIG. 3, may be subjected to a reading (read) operation as it progresses past the gaps of pole pieces 60m, and to a recording (write) action as it moves past the gaps of pole pieces 60n, and that all or a part of either of these actions or operations may be omitted by suitable switching of the electrical circuits connected to the individual transducer heads. Since those circuits are comprised in an information-processor or digital computer which is not per se a part of the present invention, they are not herein disclosed in detail. However, it is to be understood that the present invention may be used with known or conventional digital computers.

The transducing operation and the operations of the strip-moving means having been explained, it will next be explained how a strip 10 which has been selected, released and operated upon is returned to the magazine with its lug or lugs engaged with the proper selector rods and its side notches engaged with the suspender bars. The preceding descriptions have made evident the fact that the position of any strip in the pack of strips in the magazine is immaterial to the operation of the apparatus; hence strips are returned to the "top" of the pack irrespective of their code designations or numbers. Due to the normally flowing air currents passing between the strips, any selected and released strip will drop, regardless of its position in the pack, and upon return of a strip to the pack the air currents directed by grille 30g are effective to automatically re-distribute the strips in the magazine.

*Magazine loading*

Figure 5:
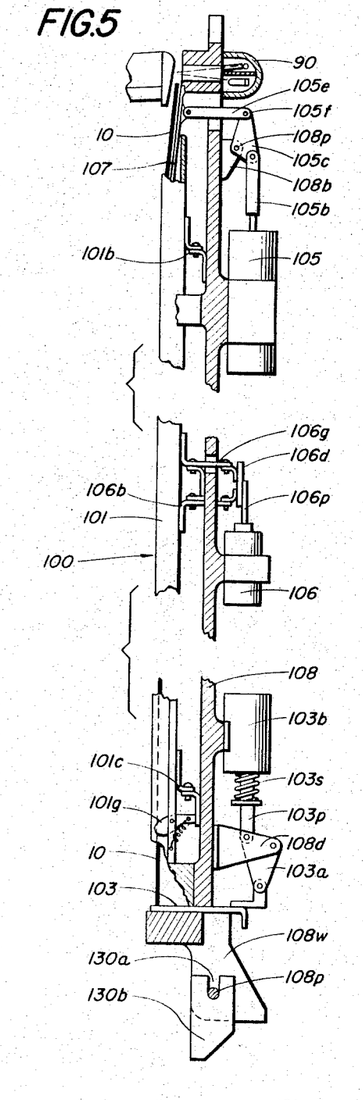
FIGS. 5 and 6 are a partial-section side-view, and a face view, respectively, of a magazine face plate and strip-loading apparatus, with sections removed to facilitate disclosure.
Figure 6:
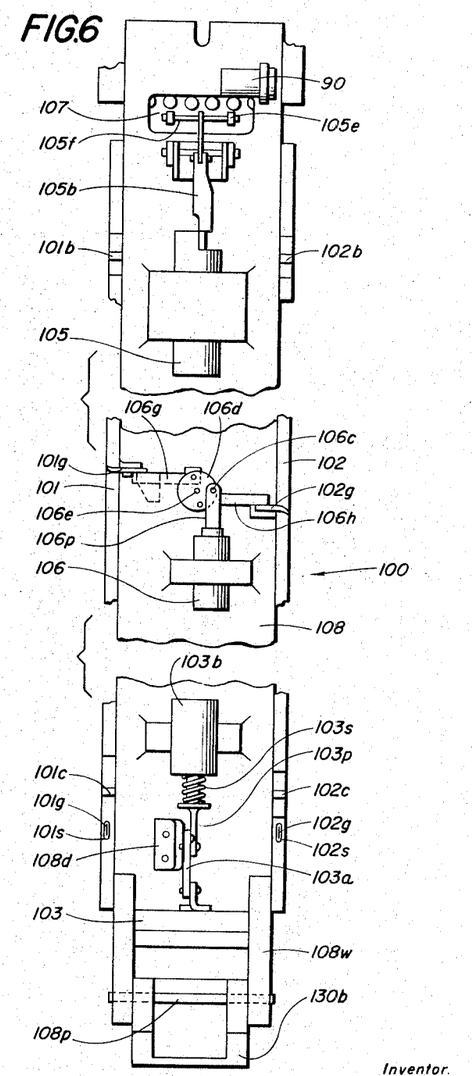
Figure 6A:
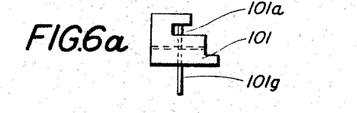
FIG. 6a is a sectional view of a strip-guide-bar, and a strip-restraining sprag.
Figure 7:
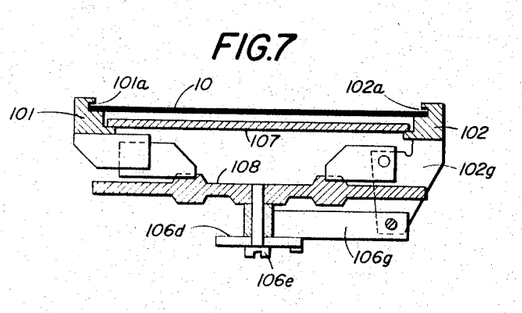
FIG. 7 is a sectional view of strip-loading means depicted in FIGS. 1, 5, and 6, illustrating an exemplary information-store strip in place ready for loading into a magazine, with parts removed.
Figure 7A:
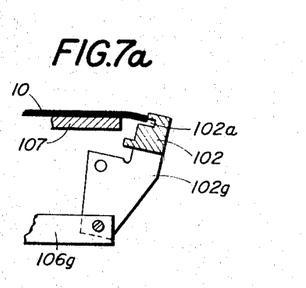
FIG. 7a is a fragmentary view illustrating the action of guide bar and loading plate means in loading a strip into a magazine.

As a strip is carried by its momentum along or through the upper curved portion 85u of the raceway 85, its leading edge interrupts the optical path of a photo-detector unit 90 (FIGS. 1, 2, 5, and 6). The detector unit thereupon transmits a signal to the controller (FIG. 16), which produces a signal which is employed to arm and initiate action of apparatus used to stop and re-suspend the strip on the bars and rods. As the leading edge (bottom end) of the strip passes the photo-detector unit it enters a straight guideway defined by opposed longitudinal grooves 101a, 102a (FIGS. 7, 7a) produced in respective hinge-mounted guide bars 101, 102 which form part of the magazine-loading mechanism designated generally by ordinal 100. The guide bars are mounted on respective pairs of hinges 101b, 101c, and 102b, 102c (FIGS. 5 and 6) secured to the magazine cover plate 108, and have guideway-opening and closing movements limited by suitable means such as stops on the hinge elements. As the strip enters and proceeds downwardly in the guideway thus provided by grooves 101a, 102a, the guide bars are in closed position as indicated in FIG. 7. Downward motion of the strip is arrested as the lower end thereof strikes a retractable sliding stop-plate 103 (FIGS. 5 and 6) which has been moved into stopping position in the path of the descending strip near the bottom ends of the guide bars as shown. The stop plate is moved by a bell-crank lever 103a operated by a solenoid-type actuator 103b. The solenoid is energized in response to the aforementioned initiation of actions by the controller (FIG. 16) in response to the signal from photo-detector means 90 as the leading (bottom) edge of the strip passes the detector. As the strip nears stop plate 103, its lower end engages a pair of pivoted sprags 101g, 102g, which are pivotally mounted in respective slot-apertures 101s, 102s formed in the guide bars, as indicated. The sprags are urged into strip-engaging attitude by the distribution of mass on opposite sides of their pivots, preferably aided by spring means as indicated in FIG. 6a. As a strip engages the sprags, the latter are pivoted slightly and pinch the strip against adjacent portions of respective guide bars, and thus rebound of the strip is prevented. Actuator 103b comprises a conventional solenoid having a movable core or plunger 103p which is returned by spring means 103s as indicated; the plunger being pivoted to lever 103a at its lower end and the lever being pivoted to a relatively fixed bracket 108d which is secured to or formed integrally with the magazine cover 108.

As the trailing (top) end of a strip passes the detector means 90, the latter emits a signal which is used by the controller (FIG. 16) to (a) initiate operation of means acting to rock the guide bars 101, 102 on their hinges into strip-releasing position, (b) initiate operation of means whose function is to load or press the upper end of the returned strip onto the suspender bars, and (c) initiate subsequent retraction of stop-plate 103. The signal from detector means 90 is electric, and is employed to trigger means, such as conventional relay means, which (a) close power-supplying circuits to a solenoid-type actuator 106 which rocks the guide bars as presently explained, and to a spring-returned solenoid-type actuator 105 which serves to actuate a loading plate 107 (FIGS. 5, 6, and 7), employed to force a strip onto the selector rods and suspender bars, and (b) open the power-supplying circuit to solenoid 103b. As indicated in FIG. 5, actuator 105 operates, when energized, to force upwardly a link 105b which is pivotally secured at its upper end to one arm of a bell-crank lever 105c. Lever 105c is pivotally mounted on a cross-pin 108p mounted in outstanding legs of a relatively fixed bracket 108b as indicated; and its upper lever arm is pivotally secured to the middle portion of a similar pin 105f secured between a pair of push bars 105e. Push bars 105e are mounted on and adapted to push (to the left in FIG. 5) the upper end of a long flat generally upright resilient loading plate 107. Normally the loading plate is retracted outwardly of the magazine by the spring means comprised in actuator 105, thus permitting a returning strip to enter the guideway provided by guide bars 101, 102; but the plate is pushed inwardly at its upper end immediately prior to and concurrently with rocking of the guide bars outwardly away from the strip, and thus, as indicated in FIG. 7a, the upper end of the strip is snapped at its upper outer edges and forced onto the free outer ends of the suspender bars.

The hinged guide bars are spread or rocked outwardly into strip-releasing attitude by linkage moved by an actuator 106 (FIGS. 5 and 6) which is secured to magazine cover plate 108. The actuator comprises a spring-stressed solenoid core or plunger 106p whose upper end is articulated to a rotatable crank-disc 106d by a pin 106c. The crank-disc is pivotally mounted on the magazine cover plate 108 at 106e and has pivotally secured thereto by crank pins a pair of draw-bars 106g, 106h which at their outer ends are pivotally secured to respective rocker-arms 101g, 102g secured to respective ones of guide bars 101, 102. The structural arrangement is such that the spring means in actuator 106 maintains the linkages in the retracted positions indicated in FIGS. 5 and 6, and such that upon energization of the solenoid in actuator 106 the plunger is drawn downwardly to thereby rotate crank-disc 106d and cause the draw-bars to rock the guide bars outwardly as indicated by the position of guide bar 102 in FIG. 7a. This outward rocking of the guide bar occurs substantially contemporaneously with the inward thrusting of the upper end of loading plate 107, and thus permits the strip 10 to snap free of its side-edge restraints as noted, and thus to be loaded onto the free outer ends of the rods and bars. As previously indicated, actuators 105 and 106 are operated in response to passage of the top end of a returning strip past the detector station at detector means 90; and shortly thereafter the concurrent de-energization of the solenoid of actuator 103b permits the spring 103s of that actuator to retract stop plate 103. The returned strip is by that time fully loaded onto the rods and bars, and actuators 105 and 106 return to their inactive positions, returning loading plate 107 and guide bars 101, 102 to strip-receiving positions. Entry of the newly-returned strip into the pack causes an immediate and automatic adjustment of strip-spacing by the air streams, the result of which is that each strip is separated from its next-adjacent neighbors. The magazine is thus prepared, in a very brief interval of a few milliseconds of time, for selection and release of the next-needed strip.

The loading strip 107, stop plate 103, actuators 103b, 105 and 106, and their appurtenant linkages, are mounted upon a readily removable magazine cover plate 108 which forms one side of the magazine structure. As indicated in FIGS. 5 and 6, plate 108 is removably supported at its lower end by a cross-pin 108s affixed in dependent wings 108w, and the cross-pin is supported in slots 130a formed in a protruding bracket 130b comprised in the housing or frame 130 of the apparatus. As indicated in FIGS. 1 and 2, the upper end of plate 108 is secured in proper relative position to the magazine frame means 130 by conventional quick-disconnect attachment means 130q. Thus the plate and loading means forming the front of the magazine may be easily removed for exchange of one set of information strips 10 by a different set from a storage file. To facilitate this operation the side face cover of the magazine is formed as a transparent door 109a (FIG. 1) which may be opened for strip-pack replacement. This cover or door is constructed and disposed to leave the upper portion of the magazine open, as indicated in FIG. 1, so as to permit exhaust of the air streams which pass downwardly between the suspended strips.

*Electrical system*

Figure 16:
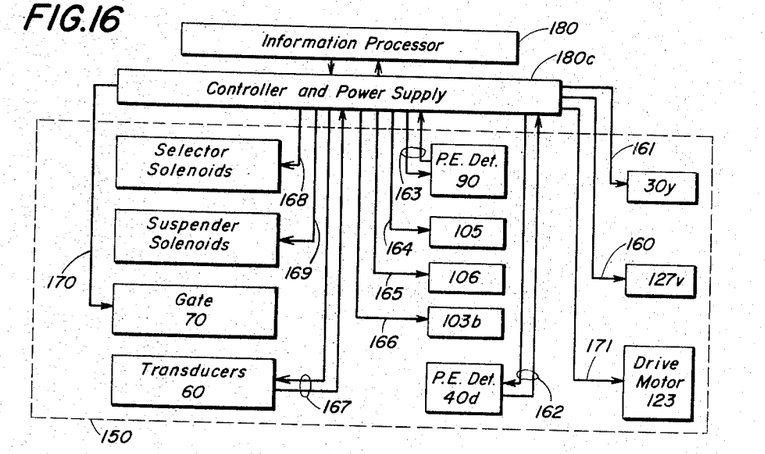
FIG. 16 is a schematic circuit and control diagram indicating interconnection of electrically energized components of the apparatus.

Referring now to FIG. 16, there are schematically depicted within dash-line rectangle 150 the electrical components of the described apparatus. These components are individually connected by respective leads or cables, such as 160, 161, etc., to a controller and power-supply means 180c whereby control or information signals may be transmitted to and from the components, and to supply operating power or current to the motor 123 and the other power-consuming elements. Signals originating in an information processor 180 are utilized by the controller to initiate (and terminate) supply of power to motor 123 (FIG. 8) via cable lead 171, and thereafter to cause selection, release, reading from a selected strip (and/or recording of information or data thereon), etc. Assuming the motor to be operating, a typical sequence of actions is as follows:

(1) A signal is transmitted to the solenoid of valve 30y over lead 161, cutting off air supply to the grille over the strips; and concurrently a signal to the solenoid of valve 127v closes that valve to cut off suction within chamber C1.

(2) Solenoids of a particular set of selector solenoids are energized by coded current-signals transmitted over cable lead 168, followed an instant later by energization of the suspender bar operating solenoids by currents through lead 169.

(3) The released strip falls into engagement with the capstan and by gravitational action combined with frictional contact with the capstan moves to a position in which it interrupts the light beam of the photo-detector unit 40d (FIGS. 1 and 2). The photo-detector thereupon produces a signal in a circuit of lead 162, which signal is translated by the controller into signals transmitted via respective leads 161 and 160 to the solenoids of valves 30y and 127v, permitting valve 30y to again supply air to the grille and causing valve 127v to restore suction in chamber C1. This signal also is normally used by the controller to initiate resetting of the selector rods and the suspender bars. The photocell signal further announces to the controller the incipient reading of information stored on the strip, permitting setting up of buffer or comparison circuits therein for selecting and/or storing the read information signals; and permits the controller to form a gate signal.

(4) A signal is transmitted from the controller to the solenoid of the gate means 70 via lead 170, to selectively cause recirculation of the strip along a path around the upper reaches of the capstan, or return of the strip to the magazine. During the period of the passage of the strip over the transducer heads, signals representing information read from the strip, or signals representing information to be recorded on the strip, or both, may course through the circuits of cables 167.

(5) Following one or more passes of the leading end of a strip across the transducer heads, and opening of gate means 70, the leading end of the strip triggers photo-detector means 90, which thereupon produces a signal which is translated by the controller into a current-signal to the solenoid of actuator 103b. The latter responds by moving the stop plate 103 into the path of the descending strip. As the trailing end of the returning strip clears photo-detector 90, the latter produces a "clear" signal to which the controller responds by sending concurrent electric current signals to the solenoids of actuators 105 and 106 over leads 164 and 165 respectively. These signals are applied momentarily and are effective to cause loading of the returned strip onto the rods and bars of the strip-suspending and selecting means.

The preceding description of an exemplary random-access information-store system according to the invention makes evident that there is provided an information-store system adapted for use with a digital information-processor system having a controller and power supply means, and which information-store system is adapted for ready interchange of one group of information-store units for any other group comprised in a large number of such groups of information-store units, each of the units within a group being uniquely distinguishable from the others of the respective group and also individually selectable from its group, and each such unit being capable of storing a large number of binary information bits arranged in a desired spatial arrangement within the unit. Further, it is evident that the system provides means for rapidly gaining access to any information-store unit comprised in a group within the system by selectively removing the unit from the group, and for transducing binary information to and from any accessed unit in a brief interval of time by operation of operating means including a rotary transport means constructed and arranged to rapidly move any selected unit through a transducing zone and past suitable information-transducing means, and also arranged to return the unit to its group following any selected number of transducing operations. In the exemplary apparatus described, dimensional configurations and numbers have been set which are exemplary only, and it is to be understood that variations therefrom falling within the scope of the appended claims are within the spirit and bounds of the invention. The description further makes evident that the invention provides a system of the named type which is compact, economical to manufacture and to operate, which utilizes re-usable information-store units, and which is adaptable to use in large information-processing systems in which it is desirable to have a plurality of rapid-action random-access information-store units connected to a principal processor by way of controller apparatus. While in the exemplary apparatus the information-store units may be constructed of polymer film such as that bearing the trade name Mylar, and of thickness about six mils and having an adherent conventional bistable magnetic coating, other suitable materials may be employed. Further, while a particular spiral disposition of peripheral apertures in the strip-transporting capstan has been shown whereby to minimize noise effects, other dispositions and/or means may be substituted to attain the same ends, within the scope of the appended claims.

From the foregoing explanation of the invention and the description of a preferred physical embodiment thereof it is evident that modifications and changes therein will occur to those skilled in the art; and it is accordingly not desired to limit the invention to specific details of the described exemplary embodiment but only as indicated by the scope of the following claims.

What is claimed is:

1. Magazine means for a random-access information-store system adapted for use in a digital information processing system, said magazine being adapted to contain a large number of coded information-store units in the form of resilient strips, said magazine means comprising: first means, including a plurality of rod-like strip-retainer elements disposed in substantially parallel relationship and each constructed and arranged for axial rotation between a first strip-retaining position and a second strip-releasing position, said elements being constructed and arranged to suspend information-store strips in generally upright attitude and to permit random release of a selected one thereof regardless of its position in said magazine means; second means, including pneumatic means and parallel-plate grill means having a plurality of parallel bars equal to at least the number of said strips, said grill means being disposed above said retainer elements and said pneumatic means being located above said parallel bars for directing air downwardly to said retainer elements via said bars, the spacing between said bars being chosen so as to space said strips apart prior to selection by forming and directing wide thin separated streams of air downwardly between each pair of adjacent suspended information-store strips; and third means for supplying air under superambient pressure to said pneumatic means prior to and during the release of a selected strip whereby when information-store strips are suspended by said elements and air is supplied by said third means, the suspended strips are by Bernoulli effect caused to separate and remain spaced apart each from the others.

2. Magazine means for a random-access information-storage system, said magazine means comprising: a plurality of individual information-storage strips each having unique coding means thereon, enclosure means in which said strips are retained as an assembled group, selecting and displacing means cooperating with the coding means on said strips to permit any strip regardless of its position in the group to be selected and removed from said group at one end of said enclosure, pneumatic means for directing air under pressure towards one end of said strips, means disposed between said pneumatic means and said one end of said strips for forming discrete air currents equal to at least the number of said strips and directing a discrete air current between each pair of adjacent strips for laterally separating the strips in said assembled group, means for causing said pneumatic means to be operative prior to and during the release of a selected strip, and loading means cooperating with the opposite end of said enclosure through which a strip is returned, said loading means including means for engaging a returning strip and for bringing it to a position adjacent the other strips in said assembled group, said loading means also including means for transferring a strip engaged by said loading means back into the assembled group so as to again be capable of selection and removal by said selecting and displacing means and without interfering with the selection and removal of a new strip by said selection and displacing means, whereby a strip may be selected and removed from said assembled group at said one end of said enclosure while a previously removed strip is being returned at said opposite end of said enclosure.

3. Magazine means for a random-access storage system, said magazine means comprising: a plurality of individual information-storage strips each having unique coding means thereon, enclosure means in which said strips are retained as an assembled group, selecting and releasing means cooperating with the coding means on said strip to permit any strip regardless of its position in the group to be selected and removed from said group at one end of said enclosure, the opposite end of said enclosure from said one end being constructed and arranged to receive a previously selected strip returning to said enclosure after traversing other portions of said system, and electrically actuable loading means including strip position-sensing means for detecting the position of a returning strip and means responsive to said strip position-sensing means for engaging a strip returning to said enclosure through said opposite end and for bringing it to a position adjacent said assembled group, said loading means also including means for disengaging a strip engaged thereby and means for temporarily laterally pushing the disengaged strip back into the assembled group so as to again be capable of selection and removal by said selecting and releasing means.

4. Magazine means for a random-access storage system, said magazine means comprising: a plurality of individual information-storage strips each having unique coding means thereon, enclosure means in which said strips are retained as an assembled group, selecting and releasing means cooperating with the coding means on said strips to permit any strip regardless of its position in the group to be selected and removed from said group at one end of said enclosure, the opposite end of said enclosure from said one end being constructed and arranged to receive a previously selected strip returning to said enclosure after traversing other portions of said system, pivotable guideway means for receiving and engaging a strip returning to said enclosure through said opposite end and for bringing it to a position adjacent said assembled group and parallel to the other strips therein, means responsive to the position of a returning strip for pivoting said guideway means so as to disengage a strip therefrom, and means also responsive to the position of a returning strip for laterally pushing a strip disengaged from said guideway means back into said assembled group so as to again be capable of selection and removal by said selecting and releasing means.

5. Magazine means for a random-access storage system, said magazine means comprising: a plurality of individual information-storage strips each having unique coding means thereon, enclosure means in which said strips are retained as an assembled group, selecting and releasing means cooperating with the coding means on said strips to permit any strip regardless of its position in the group to be selected and removed from said group at one end of said enclosure, the opposite end of said enclosure from said one end being constructed and arranged to receive a previously selected strip being returned to said enclosure after traversing other portions of said system, pivotable guideway means for receiving and engaging a strip returning to said enclosure through said opposite end and for bringing it to a position adjacent said assembled group and parallel to the other strips therein, means for preventing excessive bouncing of said strip in reaching said position, means responsive to the position of a returning strip for pivoting said guideway means so as to permit a strip to be disengaged therefrom, and means also responsive to the position of a returning strip for laterally pushing a strip disengaged from said guideway means back into said assembled group so as to again be capable of selection and removal by said selecting and releasing means.

6. Magazine means comprising: a plurality of flexible generally rectangular individual information-storage strips each having coded selection notches provided along at least one edge thereof, enclosure means in which said strips are retained as an assembled group, selecting and releasing means cooperating with said coded notches to permit any strip regardless of its position in the group to be released from said selecting and releasing means for separation from said group by longitudinal travel out of one end of said enclosure while the remaining strips in said group remain engaged with said selecting and releasing means, the opposite end of said enclosure from said one end being constructed and arranged to receive a previously selected strip traveling in a longitudinal direction in returning to said enclosure, loading means cooperating with said opposite end and responsive to the position of a strip returning to said enclosure for receiving the returning strip and placing it back in cooperative relationship with said selecting and releasing means so that the thus returned strip will again be capable of selection and release by said selecting and releasing means, said loading means including a movable stop means responsive to the position of a returning strip for stopping and restraining the longitudinal travel of a returning strip after entering said opposite end of said enclosure at a predetermined position with respect to said assembled group, said loading means also including means for moving a strip at said predetermined position into the assembled group.

7. Magazine means comprising: a plurality of flexible generally rectangular individual information storage strips each having coded selection notches provided along at least one edge thereof, enclosure means in which said strips are retained as an assembled group, selecting and releasing means releasably engaging said coded notches and cooperating therewith to permit any strip regardless of its position in the group to be released from said selecting and releasing means for separation from one end of said enclosure while the remaining strips in said group remain engaged therewith, pneumatic means for directing air under pressure towards one end of said strips, means disposed between said pneumatic means and said one end of said strips for forming discrete air currents equal to at least the number of said strips and directing a discrete air current between each pair of adjacent strips for laterally separating the strips in said assembled group, means for causing said pneumatic means to be operative prior to and during the release of a strip, the opposite end of said enclosure from said one end being constructed and arranged to receive a previously selected strip returning to said enclosure, means cooperating with said opposite end and responsive to the position of a strip returning to said enclosure for receiving the returning strip and for re-engaging the coded notches thereof on said selecting and releasing means so that the thus returned strip will again be capable of selection and release by said selecting and releasing means.

8. Magazine means comprising: a plurality of flexible generally rectangular individual information storage strips each having coded notches provided along a short edge thereof, enclosure means in which said strips are retained as an assembled group, selecting and releasing means for suspending the strips in said assembled group by said coded notches so as to hang in a generally upright position, means for directing discrete air currents at the upper edges of the strips in said group to separate the strips from one another while hanging in said enclosure, said selecting and releasing means being constructed and arranged to cooperate with said coded notches so as to permit a selected strip regardless of its position in said group to be selected and released to fall under the influence of gravity and be separated from said assembled group by longitudinal travel out of an opening provided at the lower end of said enclosure, the upper end of said enclosure being constructed and arranged to receive a previously selected strip traveling in a longitudinal direction in returning to said enclosure, pivotable guideway means for receiving and engaging a strip returning to said enclosure through said upper end and for bringing it to a position adjacent said assembled group and parallel to the other strips therein, means for preventing excessive bouncing of a returning strip in reaching said position, means responsive to the position of a returning strip for pivoting said guideway means so as to permit a strip to be disengaged therefrom, and means also responsive to the position of a returning strip for laterally pushing a strip disengaged from said guideway means so that the coded notches thereof will be re-engaged with said selecting and releasing means and will again be capable of selection and release thereby.

References Cited

UNITED STATES PATENTS

| | | | |
|---|---|---|---|
| 2,169,050 | 8/1939 | Johnston | 124—16.1 |
| 2,217,744 | 10/1940 | Gruenhut | 129—16.1 |
| 2,602,451 | 7/1952 | Hofgaard | 124—16.1 |
| 2,644,458 | 7/1953 | Meagher | 124—16.1 |
| 2,722,676 | 11/1955 | Begun | 340—174.1 X |
| 2,908,278 | 10/1959 | Goerlich | 129—16.1 |
| 2,936,169 | 5/1960 | Nelson et al. | 271—11 |
| 2,973,200 | 2/1961 | Wiener et al. | 271—26 |

FOREIGN PATENTS 614,436  12/1948  Great Britain.

JEROME SCHNALL, *Primary Examiner.*